(12) United States Patent
Vitt et al.

(10) Patent No.: US 7,169,441 B2
(45) Date of Patent: Jan. 30, 2007

(54) METHOD FOR MAKING A UV-REFLECTING INTERFERENCE LAYER SYSTEM

(75) Inventors: Bruno Vitt, Aachen (DE); Juergen Blankenburg, Osterode (DE); Werner J. Behr, Alfeld/Leine (DE); Karl-Heinz Dasecke, Gruenenplan (DE); Birgit Lintner, Mainz (DE)

(73) Assignee: Schott Spezialglas GmbH, Mainz (DE)

( * ) Notice: Subject to any disclaimer, the term of this patent is extended or adjusted under 35 U.S.C. 154(b) by 205 days.

(21) Appl. No.: 10/775,010

(22) Filed: Feb. 9, 2004

(65) Prior Publication Data

US 2004/0156984 A1 Aug. 12, 2004

Related U.S. Application Data

(63) Continuation of application No. 10/168,491, filed on Oct. 21, 2002, now Pat. No. 6,720,081.

(51) Int. Cl.
 *B05D 5/06* (2006.01)
(52) U.S. Cl. ............... 427/162; 427/164; 427/165; 427/166; 427/167; 427/168; 427/169; 427/255.7; 427/419.3; 359/580; 359/581; 359/582; 359/585; 359/586; 359/588; 359/589; 428/426; 428/428; 428/432; 428/697; 428/699; 428/701; 428/702

(58) Field of Classification Search ............... 427/162, 427/164, 165, 166, 167, 168, 169, 255.7, 427/419.3; 359/580, 581, 582, 585, 586, 359/588, 589; 428/426, 428, 432, 697, 699, 428/701, 702

See application file for complete search history.

(56) References Cited

U.S. PATENT DOCUMENTS 3,781,090 A 12/1973 Sumita (Continued)

FOREIGN PATENT DOCUMENTS

DE 3300589 C2 9/1988

(Continued)

OTHER PUBLICATIONS

Article titled *"Design of Coatings for Wide Angular Range Applications"*, Tikhonravov, et al., SPIE vol. 3133, 1997, pp. 16-24.

(Continued)

*Primary Examiner*—Alain L. Bashore
(74) *Attorney, Agent, or Firm*—Ohlandt, Greeley, Ruggiero & Perle, L.L.P.

(57) ABSTRACT

There is provided a UV-reflective interference layer system for transparent substrates with broadband anti-reflection properties in the visible wavelength range. The interference layer system includes at least four individual layers. Successive layers have different refractive indices and the individual layers contain UV and temperature-stable inorganic materials.

23 Claims, 17 Drawing Sheets

U.S. PATENT DOCUMENTS

| | | | |
|---|---|---|---|
| 3,829,197 A | | 8/1974 | Thelen |
| 3,858,965 A | * | 1/1975 | Sumita ................... 359/588 |
| 4,293,732 A | | 10/1981 | Rancourt et al. |
| 4,313,647 A | * | 2/1982 | Takazawa ................ 359/588 |
| 4,850,660 A | * | 7/1989 | Jones et al. .............. 359/359 |
| 5,073,451 A | * | 12/1991 | Iida et al. ................ 428/336 |
| 5,399,435 A | | 3/1995 | Ando et al. |
| 5,449,413 A | | 9/1995 | Beauchamp et al. |
| 5,453,859 A | * | 9/1995 | Sannohe et al. ............. 349/9 |
| 5,532,871 A | * | 7/1996 | Hashimoto et al. ........ 359/359 |
| 5,822,124 A | * | 10/1998 | Matsuda et al. ........... 359/583 |
| 5,933,273 A | | 8/1999 | Ferrante et al. |
| 6,104,534 A | * | 8/2000 | Ohta et al. ................ 359/588 |
| 6,107,564 A | | 8/2000 | Aguilera et al. |
| 6,139,968 A | | 10/2000 | Knapp et al. |
| 6,379,803 B1 | | 4/2002 | Nakamura et al. |
| 2001/0031365 A1 | * | 10/2001 | Anderson et al. .......... 428/432 |

FOREIGN PATENT DOCUMENTS

| | | | |
|---|---|---|---|
| DE | 4326947 | | 4/1995 |
| EP | 0 300 579 A2 | | 7/1988 |
| EP | 0 438 646 B1 | | 11/1990 |
| EP | 0492485 | | 11/1991 |
| EP | 0727813 | | 8/1996 |
| JP | 05341121 | | 12/1993 |
| JP | 05341122 | | 12/1993 |
| JP | 07-244202 A | * | 9/1995 |
| JP | 07-244204 A | * | 9/1995 |
| JP | 2000-347002 A | * | 12/2000 |
| WO | WO/0027771 | | 5/2000 |

OTHER PUBLICATIONS

Article titled "*Application of the Needle Optimization Technique to the Design of Optical Coatings*", Tikhonravov, et al., Applied Optics, Oct. 1, 1996, vol. 35, No. 28, pp. 5493-5508.

Tikhonravov et al. "Design of Coatings for Wide Angular Range Applications". SPIE vol. 3133. pp. 16-20.

Tikhonravov et al. "Application of the Needle Optimization Technique to the Design of Optical Coatings". Oct. 1, 1996. Applied Optics vol. 35. pp. 5439-5508.

\* cited by examiner

METHOD FOR MAKING A UV-REFLECTING INTERFERENCE LAYER SYSTEM

CROSS-REFERENCE TO RELATED APPLICATIONS

The present application is a continuation of U.S. patent application Ser. No. 10/168,491, which issued as U.S. Pat. No. 6,720,081 and was filed on Oct. 21, 2002, which claims priority of International Patent Application PCT/EP00/12878, which was filed Dec. 15, 2000. The present application is also claiming priority of German Patent Application DE 199 62 144.6, filed Dec. 22, 1999.

BACKGROUND OF THE INVENTION

1. Field of the Invention

The invention concerns a UV-reflective interference layer system for transparent substrates with broadband antireflection in the visible wavelength range, a method for coating a substrate with such a layer system, and the use of such coating systems in various fields of application.

2. Description of the Prior Art

Currently known glass antireflections for the visible spectral range, such as the MIROGARD or the AMIRAN antireflection of Schott-DESAG AG, Grünenplan, are interference filters of three layers, wherein a layer with an intermediate index of refraction is first deposited, followed by a layer with high index of refraction, usually $TiO_2$, and then a layer with low index of refraction, usually $SiO_2$ or $MgF_2$. As the layer with intermediate index of refraction, for example, a mixture of $SiO_2$ and $TiO_2$, but also $Al_2O_3$ is used. Such three-layer antireflections are deposited, for example, on eyeglass lenses, on monitors, on plate glass, such as display window panels, on treated lenses, etc.

In most instances, these filters have a blue-violet or green residual reflection. When light impinges perpendicularly, the reflection characteristic of glasses coated on both sides is characterized in that the reflection within the wavelength interval of around 400–700 nm is less than 1%, for example, but outside this range the reflection rises to values of up to around 30% (V or W-shaped characteristic), i.e., far above the 8% of uncoated glass.

The drawback to such systems is that, when viewing at an angle that increasingly deviates from the perpendicular, the characteristic shifts to ever shorter wavelengths, so that the long-wave reflection maximum ends up in the visible range, and produces an undesirable red component to the reflected light color.

One goal of the present invention is therefore to find an antireflection whose residual reflection is low in a much broader wavelength range, i.e., in the range from 400 to at least 800 nm with perpendicular incidence of light, and which furthermore also provides broadband antireflection at rather large viewing angles. In many applications, such as display window glazings or glazings for pictures, a neutral-color appearance is in fact desirable, especially for different viewing angles.

Especially for picture glazings, say, in museums, but also in the case of display window glazings, furthermore, it is desirable that an antireflecting glass—if possible, color-neutral—at the same time provides the function of protecting the colors of the picture or the natural or synthetic fibers, as well as the dyestuffs of the window displays, against ultraviolet light.

As is known, the UV component of sunlight or that of lamp light, especially in the case of metal halide or other gas discharge lamps, but also even with halogen bulbs, is sufficient to cause considerable damage over a lengthy period of time, such as discoloration or embrittlement of natural or synthetic fabrics. A UV protection would also be desirable for glazings in office or residential buildings, in order to greatly reduce the fading of wood surfaces, draperies, upholstered furniture, etc., under direct sunlight, and thus enable, for example, an improved passive utilization of solar energy. Present-day thermal protection glasses, which contain a thin silver layer, are not antireflective in the visible range, and furthermore also do not offer sufficient UV protection, since thin silver layers become transparent in the UV.

In the case of known antireflective soft glass, UV protection is achieved by the use of organic polymers as absorbers of UV light, for example, as compound glass, wherein two glass panes are laminated together with a PVB plastic foil adapted by its index of refraction to the glass, for example, 380 μm in thickness (the glass MIROGARD-PROTECT from Schott-DESAG). Such glasses are [used] under intense lamp light, for example, as front panels for lamps, but they are not temperature-stable and they are also degraded by intensive UV radiation. Also, their three-layer antireflection on one side has the above-mentioned limitations, and furthermore the production of compound glass is costly.

Another possibility is the use of UV-absorbing varnish layers, which are several micrometers thick and are transparent to visible light. Such varnish layers are likewise not stable to UV and temperature, and after being deposited on the glass they must further be made antireflective. Regarding the state of the art, refer also to the following publications:

D1: H. Schröder, "Oxide Layers Deposited from Organic Solutions", in Physics of Thin Films, Academic Press, New York, London, Vol. 5 (1969), pp. 87–140

D2: H. Schröder, Optica Acta 9, 249 (1962)

D3: W. Geffeken, Glastech. Ber. 24, p. 143 (1951)

D4: H. Dislich, E. Hussmann, Thin Solid films 77 (1981), pp. 129–139

D5: N. Arfsten, B. Kaufmann, H. Dislich, Patent DE 3300589 C2

D6: N. Arfsten, B. Lintner, et al., Patent DE 4326947 C1

D7: A. Pein, European Patent 0 438 646 B1

D8: I. Brock, G. Frank, B. Vitt, European Patent 0 300 579 A2

D9: Kienel/Frey (ed.), "Dünnschicht-Technologie [Thin layer technology]", VDI-Verlag, Düsseldorf (1987)

D10: R. A. Häfer, "Oberflächen- und Dünnschicht-Technologie [Surface and thin layer technology]", Part I, "Coating of Surfaces", Springer-Verlag (1987)

whose disclosure contents are fully incorporated in the present application.

SUMMARY OF THE INVENTION

The object of the invention is to specify a coating for a transparent substrate, especially glasses, with which the above-described disadvantages can be overcome.

In particular, one should achieve a UV filtering, on the one hand, without the use of UV or temperature-unstable polymer foils or varnish, and, on the other hand, the antireflection of visible light should be much more broadband and color neutral at the same time.

As regards the UV filtering, one should achieve approximately the same characteristics as for foil or varnish systems.

According to the invention, the object is solved by an interference layer system that comprises at least four individual layers, wherein the consecutive layers have different indices of refraction and the individual layers comprise UV and temperature-stable inorganic materials.

Especially preferred is an interference layer system of five layers with the structure: glass+M1/T1/M2/T2/S, wherein the high-refracting material T has an index of refraction in the range of 1.9–2.3 at a wavelength of 550 nm, the low-refracting material S has an index of refraction between 1.38 and 1.50, and the intermediate-refracting material M has an index of refraction in the range of 1.6–1.8, with layer thicknesses of the individual materials in the ranges of 70 to 100 nm (M1), 30 to 70 nm (T1), 20 to 40 nm (M2), 30 to 50 nm (T2), and 90 to 110 nm (S).

In one embodiment of the invention the highly refractive material is titanium dioxide, the low-refracting material is silicon dioxide, and the intermediate-refracting material is a mixture of these substances.

In an alternative embodiment, instead of titanium dioxide one can also use niobium oxide $Nb_2O_5$, tantalum oxide $Ta_2O_5$, cerium oxide $CeO_2$, hafnium oxide $HfO_2$, as well as mixtures thereof with titanium dioxide or with each other, as the high-refractive layers; instead of silicon dioxide one can also use magnesium fluoride $MgF_2$ as the low-refractive layer; and instead of Ti—Si oxide mixtures one can also use aluminum oxide $Al_2O_3$ or zirconium oxide $ZrO_2$ as the intermediate-refractive layers.

As the transparent substrate, in a first embodiment, one can use soft glass in the form of float glass, including a low-iron form.

As an alternative to this, one can also use hard glasses as the substrate, especially aluminosilicate and borosilicate hard glasses or quartz glass.

Besides the interference layer system, the invention also provides a method for applying it onto a substrate.

In a first embodiment of the invention, the individual layers are deposited by means of the dip method or the spin method of sol-gel techniques.

As an alternative to this, the layers can be deposited by cathode sputtering (for example), by physical vaporization, or by chemical gas-phase deposition, especially plasma-supported.

Especially preferred, the interference coatings according to the invention are deposited on transparent substrates comprising an infrared-reflecting thermal protection coating, or transparent layers comprising an interference layer system according to the invention are provided with a thermal protection layer, so that a UV-reflective thermal protection glass is obtained.

Thermal protection glasses are based on the principle of reflection of the infrared heat radiation by a thin, electrically conductive coating that is largely transparent in the visible range. Basically, tin oxide and silver-based layers are considered as heat-reflecting coatings.

Tin oxide can be deposited immediately after the float glass production—and application of a diffusion-inhibiting SiOx preliminary coating—in the cool-down phase at around 600° C. by means of a spray process. By doping with fluorine or antimony, surface resistances up to 15 Ohms for a layer thickness of around 300 nm are achieved, so that a more than 80% degree of infrared reflection averaged out over the distribution of 300 K thermal radiation is achieved. As window glazing, therefore, this glass reflects back the majority of the thermal radiation into the space of a building.

The tin oxide deposited by spray pyrolysis during float glass production of interior double-pane glass, for example, must be protected against cleaning, even though it has good mechanical and chemical stability, since substances get worn down due to the relatively high roughness and hardness applied during cleaning processes, and drying is made difficult.

In the double-pane insulated glass composite with an uncoated flat glass pane, these glasses achieve a heat transfer value—depending on the gas filling and the glass spacing—of up to $k=1.6$ $W/m^2K$. The drawback is the only moderate visible transmission of 75% of such a double-pane insulated glass for two panes with thickness of 4 mm, which is predominantly attributable to the reflection at the boundary layers. The UV transmission, which should be as low as possible not only when used as glazing for museums or textile shops, but also for residential or office buildings, is 35% in the range of 280 to 380 nm.

Instead of doped tin oxide $SnO_2$:F,Sb, one can also use the transparent semiconductor materials zinc oxide ZnO:Al (aluminum-doped) and indium oxide $In_2O_3$:Sn (tin-doped, "ITO"). Although ITO has a considerably lower electrochemical stability than tin oxide and requires further treatments after the spraying process, zinc oxide cannot be produced with sufficient electrical conductivity by means of a spray process.

Silver-based heat-reflecting coatings achieve significantly more favorable surface resistances down to less than 1 Ohm and, thus, infrared emission levels of 9 to 4%, at the limit down to 2%, so that k-values of 1.1 to 1.4 $W/m^2K$ are possible on the basis of such a coated pane in the double-pane insulated glass compound. The visible transmission in this case is at most 76% and if the silver layers are thicker it drops to around 68% for k-values below 1.0 $W/m^2K$. The UV transmission is 36–19%.

The deposition of silver layers is more favorable in terms of thermal reflection, but after the glass production it must be conducted by costly vacuum coating methods, and furthermore additional dielectric layers surrounding the silver layer on both sides and possibly also metal layers to improve the transmission and the long-term stability are required.

A further drawback is that the silver layer composite can only be used on the inside of double-pane insulated glasses, since there is no permanent mechanical or even chemical stability with respect to cleaning processes.

The visible transmission of heat-reflecting insulated glasses, as described above, is inadequate both in the case of tin oxide and for silver-based layers. With an antireflection coating on all four boundary surfaces of a double-pane insulated glass one can obtain glasses whose visible transmission is boosted to 88%. However, the UV transmission is still 25%.

By applying an interference layer system according to the invention, one can obtain thermal protection glasses with low transmission in the UV range and high transmission in the visible range, so-called UV-reflective thermal protection glasses.

Preferably, a UV-reflective thermal protection glass according to the invention comprises an infrared-reflecting thermal protection plate glass, coated with electrically conductive tin oxide, being provided on both sides with a UV-reflective interference layer system, a single pane that is coated on one side with tin oxide and then provided on both sides with the UV-reflective, broadband antireflecting multilayer coating [has] a (mean) visible transmission of 90% or more, as well as a UV transmission (280–380 nm) of 8% or less, while the thermal radiation properties of the tin oxide remain unchanged.

As an alternative to this, UV-reflective thermal protection glasses can be obtained with silver-based, heat-reflecting "low-e" layers, especially in the form of double-pane insulated glasses. If all the other three glass surfaces except the low-e layer applied to the inside of a glass surface are provided with an interference layer system, the visible transmission increases, for example, from 76% to 85%—for unchanged heat-transfer value k—while the UV transmission is reduced from approximately 30% to around 4%.

If the low-e layer is applied on one side of a plate glass previously made antireflecting on both sides with an interference layer system according to the invention, and combined with a second pane made antireflecting on both sides with an interference layer system as a double-pane insulating glass, the visible transmission is further increased to 87%, while the UV transmission is reduced to 3%.

If the second pane is coated on one side with tin oxide prior to making both sides antireflecting with an interference layer system, the k-value will be reduced by around 0.2 W/m²K, i.e., from 1.0 to 0.8 W/m²K, for example.

The visible transmission of a single pane coated with tin oxide on one side and made antireflecting with an interference layer system on both sides, having a thickness of 4 mm, is 10% higher in absolute terms than that of tin oxide thermal protection glass not made antireflecting, and 2 to 3% higher than that of uncoated float glass. At the same time, the UV transmission is lowered from approximately 45% to 8% without application of polymer varnish or foil.

If one combines a tin oxide-coated single pane provided with the UV-reflective interference layer system on both sides with an identical second pane, the remaining UV transmission will be lowered to 3%, and only a small residue of long-wave radiation will still be admitted in the wavelength region of 360 to 380 nm.

At the same time, the thermal protection properties are significantly improved by the infrared reflection now at two tin oxide layers, and k-values of around 1.2 W/m²K are possible, such as are otherwise achieved only with silver-based thermal protection glasses. The application of a double, IR-reflecting tin oxide layer is only possible because, thanks to the efficient broadband antireflection of all four boundary surfaces with an interference layer system according to the invention, the total visible transmission is around 87% for normal iron-containing float glass with two panes of 4 mm thickness each.

If—as has been customary thus far—only one layer of tin oxide is used in a double-pane thermal protection glass, the k-value remains at the minimal 1.6 W/m²K, associated with a somewhat higher visible transmission of 88% and a UV transmission of 4%.

BRIEF DESCRIPTION OF THE DRAWINGS

The invention shall now be described more closely by means of the figures.

These show.

DESCRIPTION OF THE INVENTION

Figure 1:
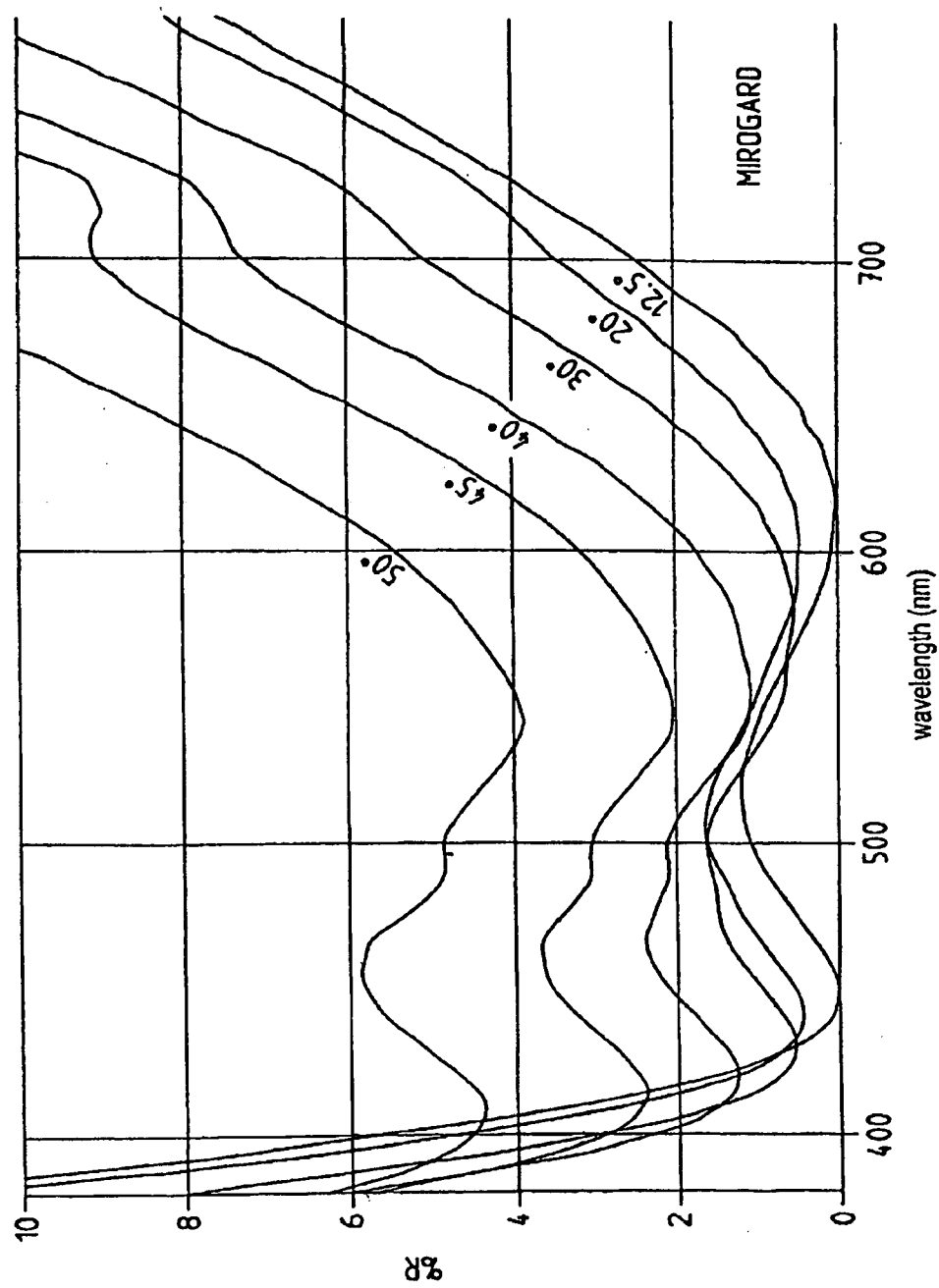
FIG. 1 the degree of reflection plotted against the wavelength as a function of the angle of incidence of the MIROGARD antireflection of SCHOTT-DESAG, Grünenplan, according to the state of the art FIG. 2 the degree of reflection plotted against the wavelength as a function of the angle of incidence of the AMIRAN antireflection of SCHOTT-DESAG, Grünenplan, according to the state of the art FIG. 3 the transmissibility of UV filters on soft glass according to the state of the art, as a function of wavelength FIG. 4 the transmission spectrum of a system according to the invention according to Example of embodiment 1

FIG. 1 shows the dependence of the degree of reflection R on the angle of incidence for the MIROGARD antireflection of Schott-DESAG. The measurements of the degree of reflection were plotted for various angles (12.5 to 50°) of the incident light vs. the normal line to the surface.

Figure 2:
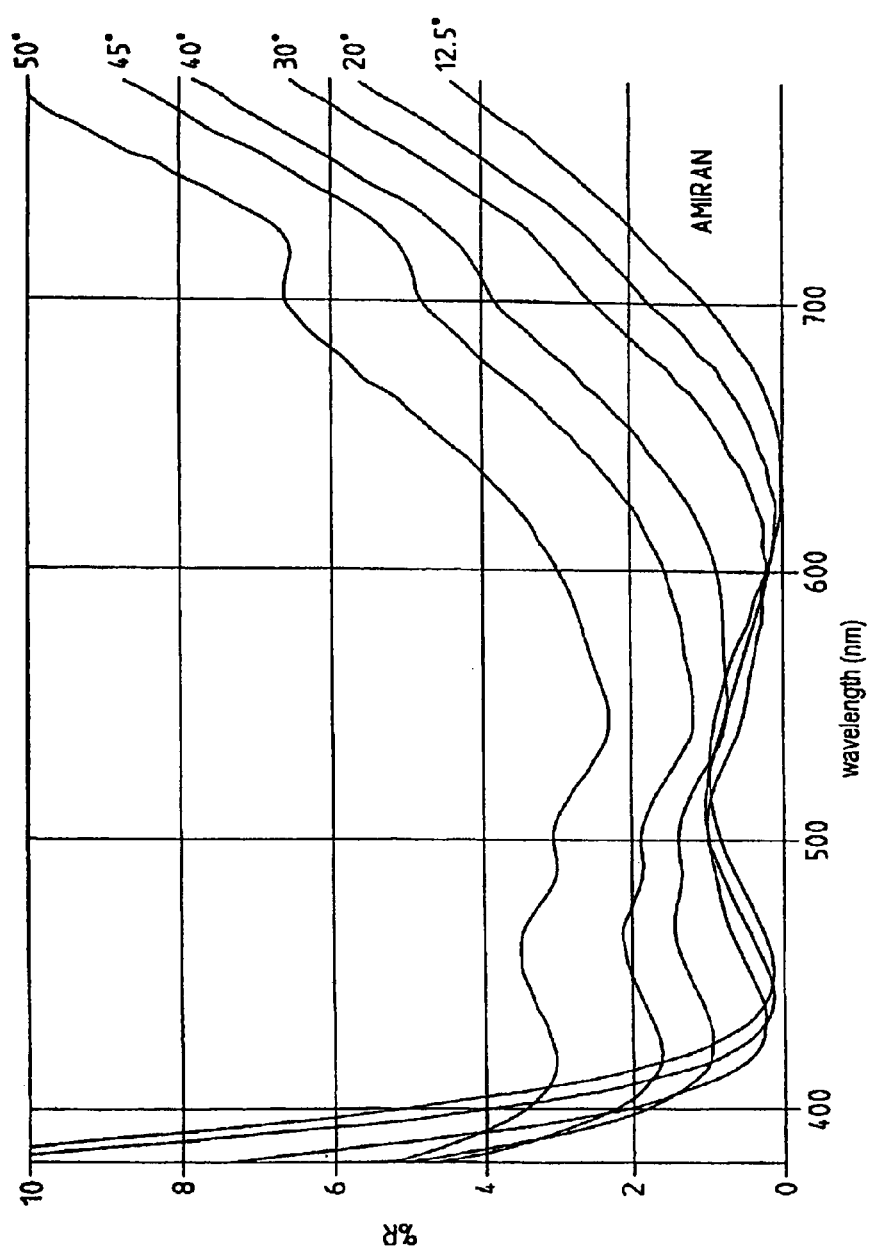

FIG. 2 shows the degree of reflection R for the three-layer AMIRAN antireflections of Schott-DESAG AG, Grünenplan.

The systems according to FIGS. 1 and 2 show a strong dependence of the degree of reflection on the angle of incidence of the light.

Figure 3:
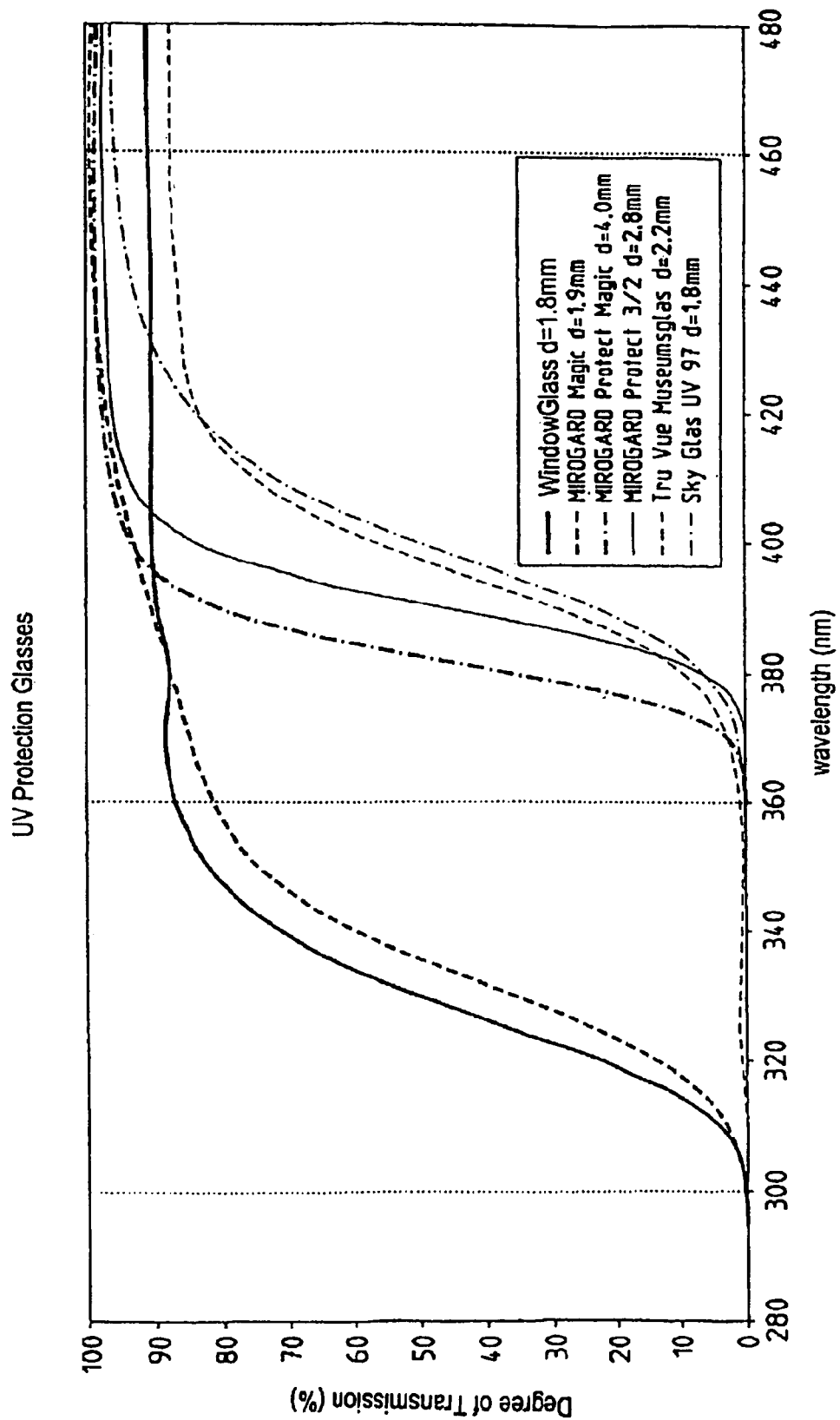

FIG. 3 shows the transmissibility of various UV filters according to the state of the art on soft glass as a function of wavelength. Normal window glass is practically nontransmissible below 290 nm, because of absorption, so that only an improved blocking in the UV-B region, i.e., to 315 nm, and primarily the blocking at 315 and 380 nm remains as a problem.

A MIROGARD three-layer antireflection without plastic foil already provides a slight improvement in the UV blocking by absorption and reflection as compared to uncoated glass. MIROGARD-Protect compound glass is very effective as a UV-A blocker, as are TrueVue and Sky Glas, but TrueVue is very blue in reflection and significantly yellow in transmission.

Examples 1–3 of a system according to the invention with properties that are improved compared to the prior art shall now be described in detail:

EXAMPLE 1

Color-Neutral Filter

A UV filter with combined broadband antireflecting action is produced on both sides of soft glass (d=3 mm, not iron-poor) by the dip method (sol-gel process), for the purpose of the most color-neutral appearance.

The coatings on both sides each consist of five individual layers and possess the structure: glass+M*+T+M+T+S. The individual layers are applied identically on both sides in a dipping step.

The layers designated T contain titanium dioxide $TiO_2$, the cover layer designated S contains silicon dioxide $SiO_2$, and the M layers are each drawn from mixed S and T solutions.

The float glass substrate is carefully cleaned prior to the coating. The dip solutions are each applied in climate-controlled rooms of 28° C. with humidity of 7 to 12 g/m$^3$, the drawing speeds for the individual layers M*/T/M/T/S being: 495/262/345/206/498 mm/min.

The drawing of each gel layer is followed by a baking in air. The baking temperatures and times are 180° C./20 min. after production of the first, second and third gel layers and 440° C./30 min. after the fourth and fifth layers.

In the case of the T layers, the dip solution (per liter) is composed of:

68 ml of titanium-n-butylate, 918 ml of ethanol (abs.), 5 ml of acetylacetone, and 9 ml of ethyl-butyrylacetate.

The dip solution for production of the S layer contains:

125 ml of methyl silicate, 400 ml of ethanol (abs.), 75 ml of $H_2[O]$ (distilled), 7.5 ml of acetic acid, and is diluted with 393 ml of ethanol (abs.) after a resting time of around 12 h.

The coating solutions for production of the oxides with intermediate index of refraction are prepared by mixing the S and T solutions. The layer designated M in Example 1 is drawn from a dip solution with a silicon dioxide content of 5.5 g/l and a titanium dioxide content of 2.8 g/l; the corresponding oxide contents of the M* dip solution are 11.0 g/l and 8.5 g/l.

The wet chemistry sol-gel process used in Example 1, in the form of a dip process, enables the economical coating of large surfaces such as architectural glass with interference filters, wherein the possibility of coating both sides in a single work step and the production of mixed oxides with the particular desired index of refraction are of great advantage.

Panes can be coated either on both sides or, after covering one side of the glass, just on one side.

Alternative coating methods are physical vaporization in high vacuum and modifications of this process in terms of ionic and plasma assistance, and cathode sputtering.

Figure 4:
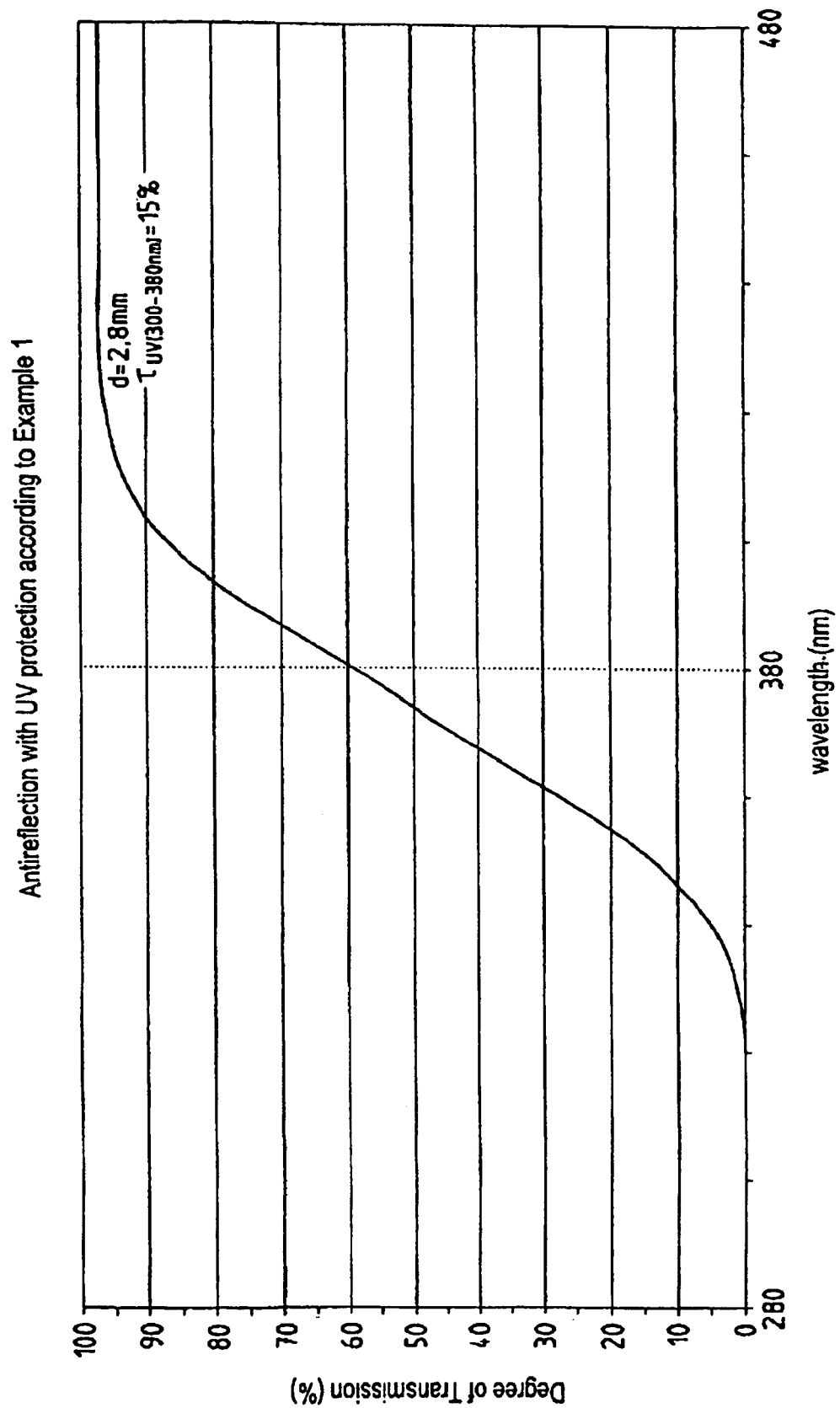

FIG. 4 shows the transmission spectrum of a filter according to the invention in the wavelength range of 280 to 480 nm, made according to Example of embodiment 1 (color-neutral filter). Even without the use of polymer substances, the dangerous UV-B region is completely blocked, and the UV-A region is more than ⅔ blocked, while only the less dangerous range of 340–380 nm is around ⅓ transmitted. It should be noted that the harmfulness of UV radiation increases steadily toward shorter wavelengths.

Figure 5:
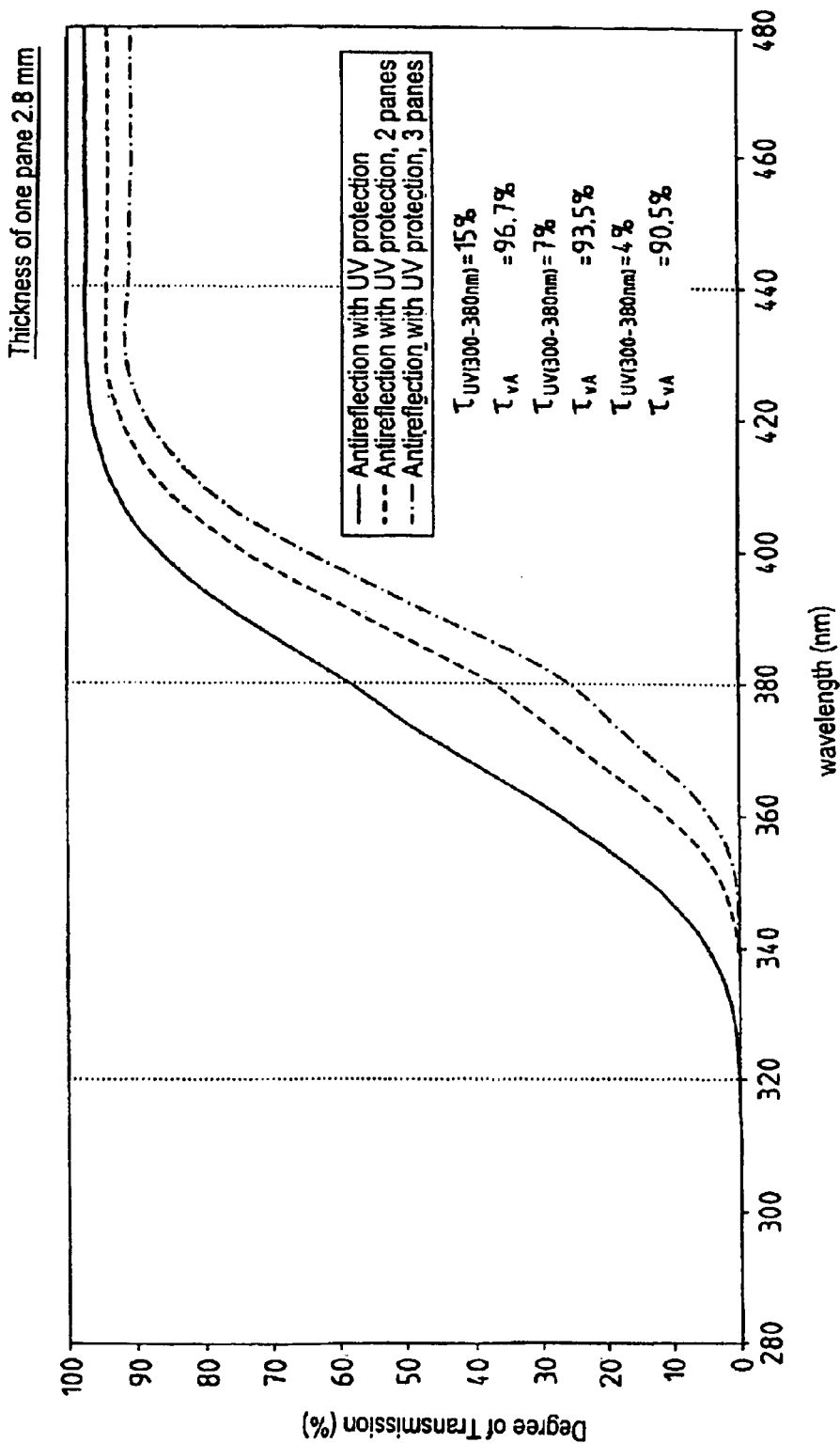
FIG. 5 the transmission spectrum of a system according to Example of embodiment 1 with several panes FIG. 6 reflection characteristic of a system according to the invention FIG. 7 reflection characteristic of a system according to the invention with an angle of incidence of $\phi=30°$ FIGS. 8a, 8b reflection characteristic of a system according to the invention for an angle of incidence $\phi=8°$ FIG. 9 reflection characteristic of a system according to the invention according to Example 2

The transmissibility in the wavelength range of 300 to 380 nm is 15%, which is a UV attenuation by a factor of 4 as compared to an uncoated glass pane (around 60%). In the case of building glazings, however, double panes are usually employed, and less often triple panes. The use of multiple panes further improves the UV protection considerably, as FIG. 5 shows.

In the case of double panes, each provided with the UV filter according to the invention on both sides, the transmissibility in the range of 300–380 nm is already reduced to 7%; for triple panes, a value of 4% has been measured. At the same time, the reflection losses in the region of visible sunlight for these architectural glazings are only around 1% for single panes, and around 2% or 3% for double or triple panes, respectively. As compared to uncoated glasses, this signifies a 7% reduction of the reflection losses in absolute terms for the single pane, and 14% and 21% for the double and triple panes, respectively.

Especially for glazings of museums and textile specialty shops, this creates a new state of the art, since the five-layer filter of the invention represents only a relatively small additional expense compared to the three-layer solution.

Furthermore, the filter according to the invention also solves the problem of realizing at the same time a color-neutral antireflection, which also guarantees a color-neutral antireflection at rather large viewing angles, thanks to the broad width of the range of low reflection.

Figure 6:
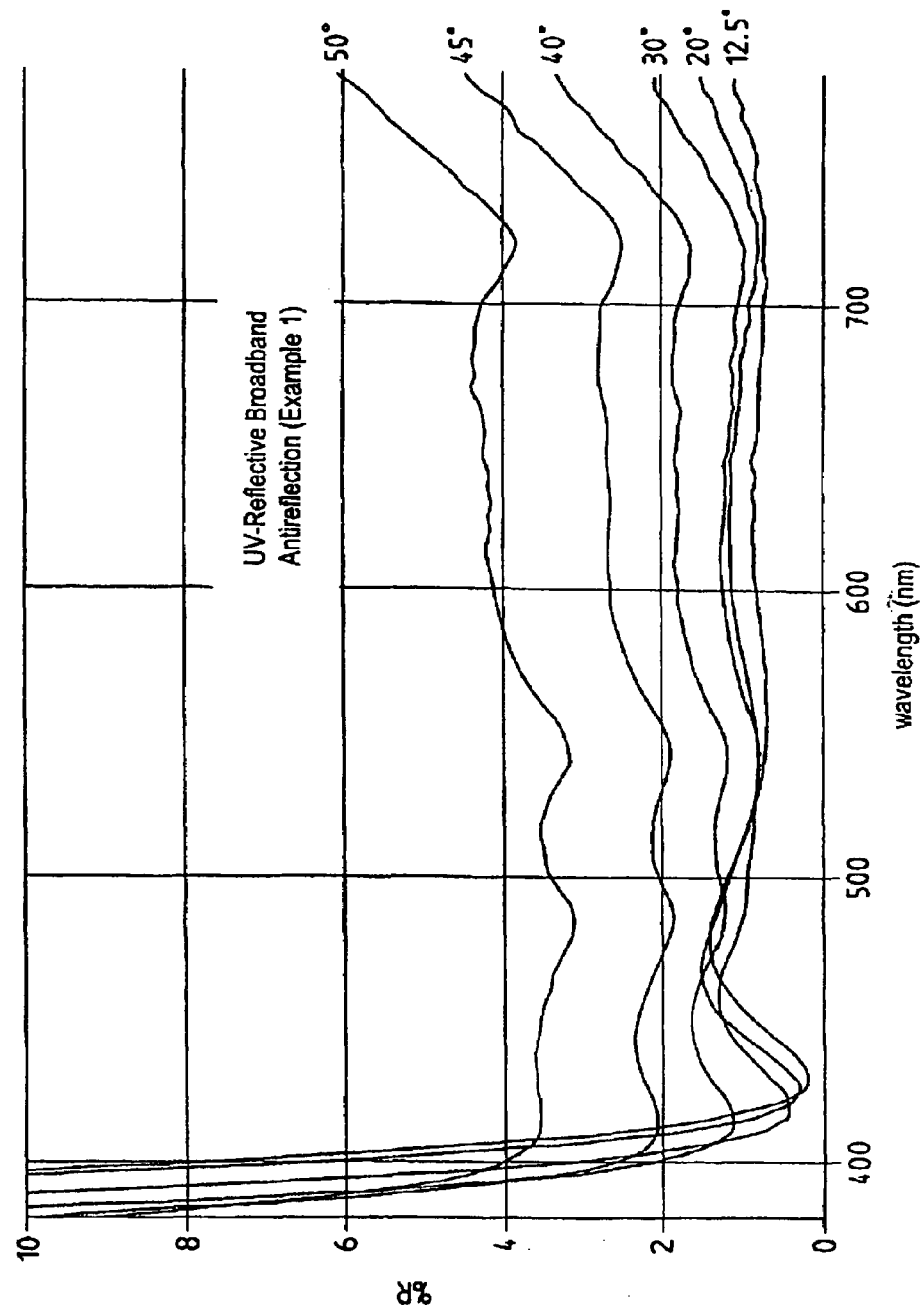
Figure 7:
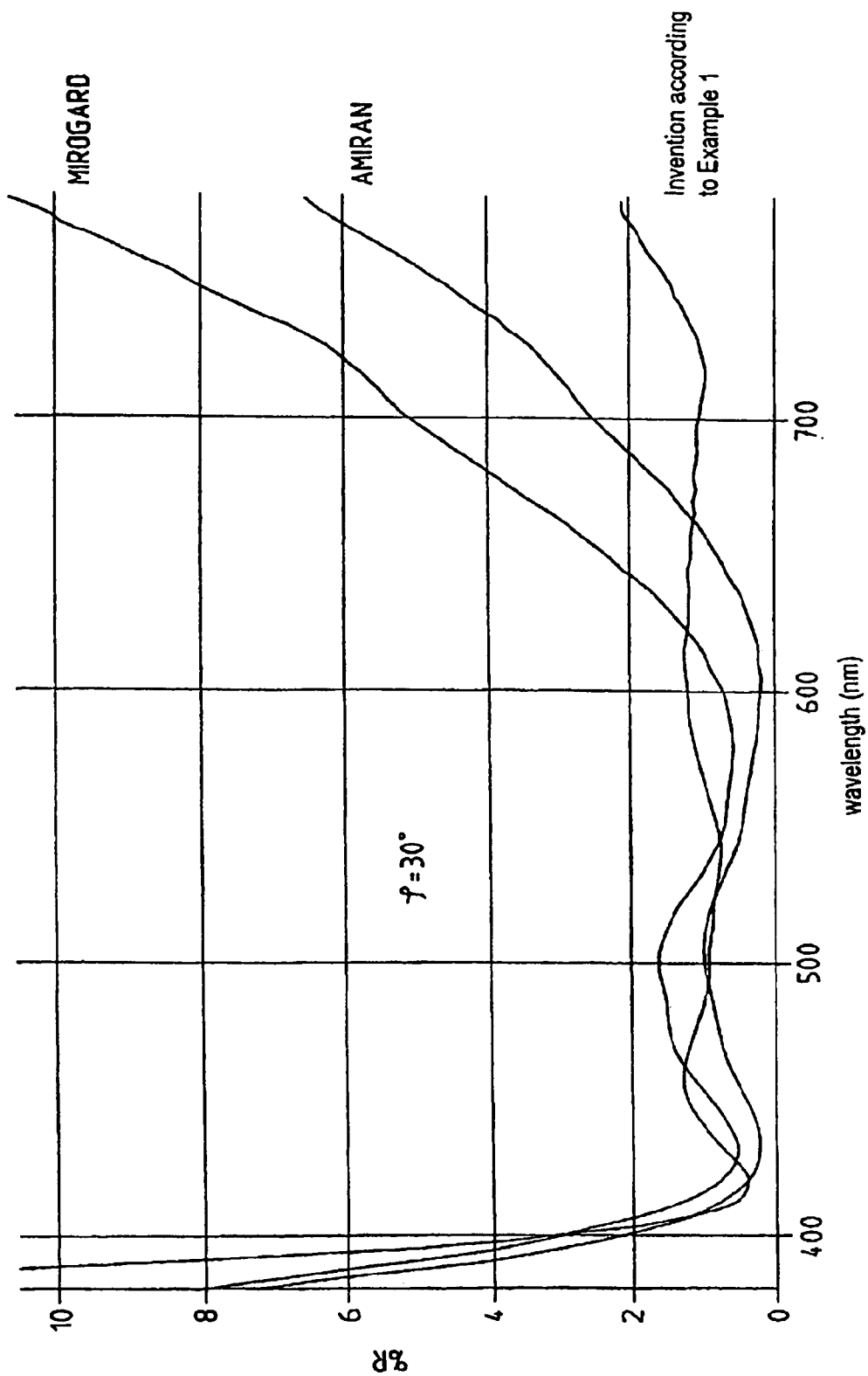

FIG. 6 shows the measured reflection characteristic of the filter according to the invention in the visible region of 380 to 780 nm as a function of the viewing angle (12.5–50°). A comparison with FIGS. 1 and 2 demonstrates the superiority of the solution according to the invention as compared to MIROGARD and also AMIRAN in terms of broadbandedness, including in particular rather large viewing angles. This is also apparent from FIG. 7 by comparing the filter according to the invention with these three-layer solutions for a given viewing angle of 30°.

Figure 8A:
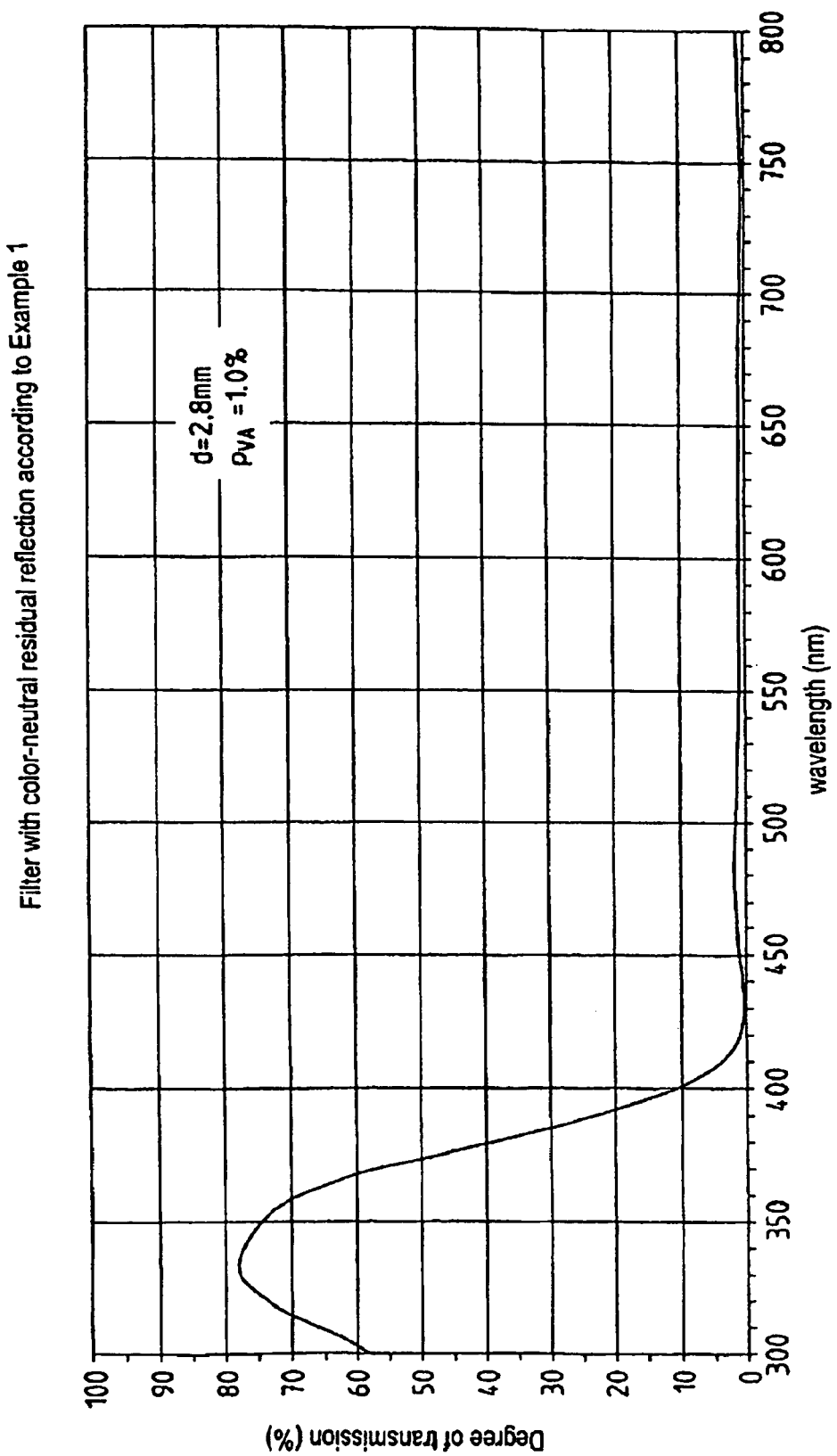
Figure 8B:
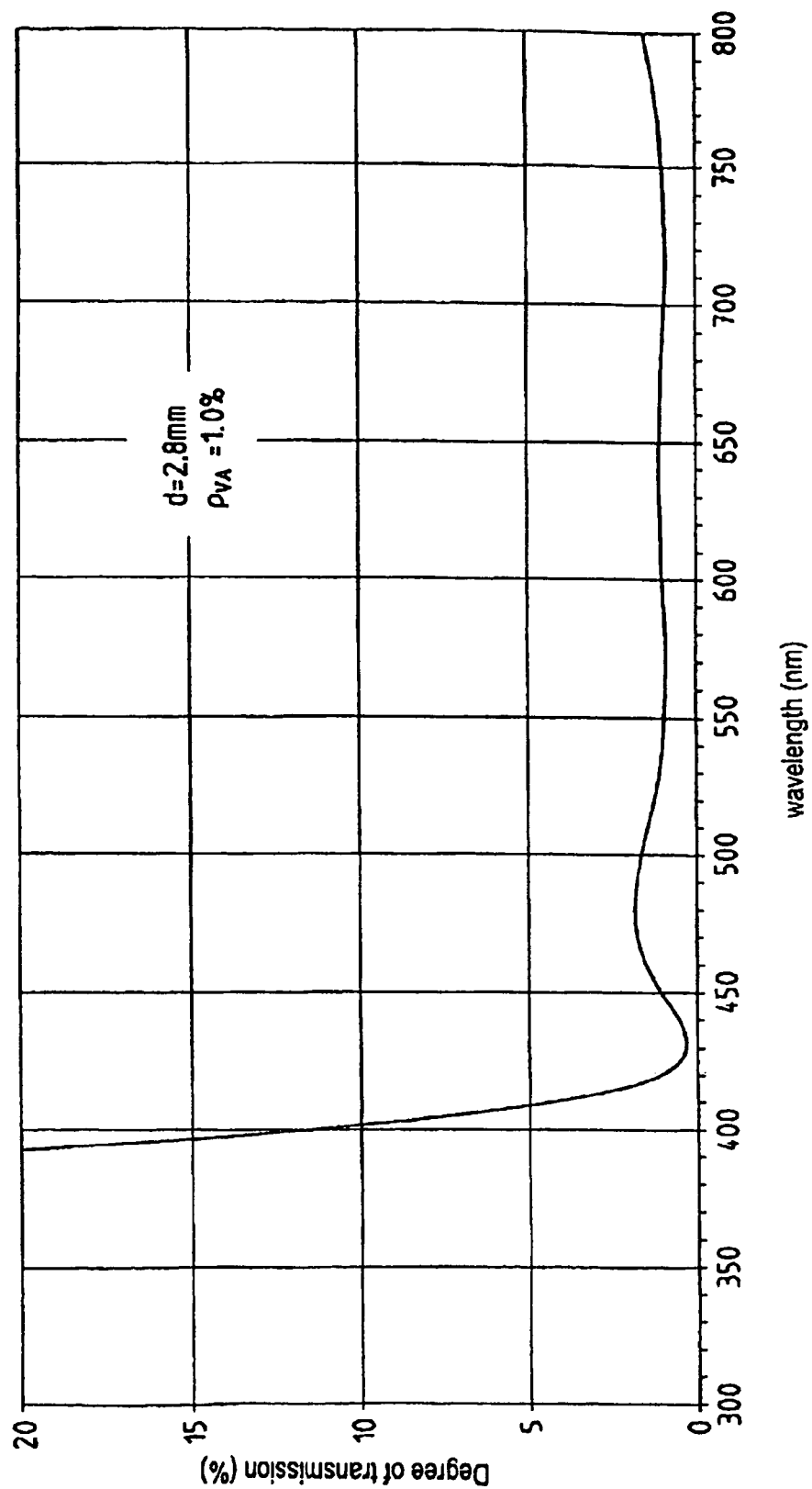

FIGS. 8a and 8b show the reflection spectrum for a viewing angle of 8° with different scales for R, and a wavelength range that is especially enlarged in the UV direction: the average degree of reflection in the region of 400 to 800 nm is 1%, the subjective color impression is essentially more neutral, especially for large viewing angles above 30°, than is the case with all traditional three-layer antireflections.

As FIG. 8a shows, the blocking action of the UV filter according to the invention is based primarily on reflection, and less on absorption (UV reflector). The thus-produced optical filters not only exhibit the above-described wavelength-dependent transmission and reflection characteristic, but also are distinguished in particular by a high optical quality, they are free of cracks, opacities, and light scattering, and provide a very color-neutral impression in reflection. Yet neither do they have any color-distorting effect in transmission, which is very important for picture glazings, for example.

The following service-life and application tests were carried out with filters produced according to Example 1 with regard to an application in interior rooms:

Boil test (DIN 51 165), water of condensation/constant climate (DIN 50 017), salt spray/mist test (DIN 50 021), Cass test (copper chloride+acetic acid+NaCl)

and with regard to exterior application

Test for resistance to water of condensation, test for acid resistance, test for wear resistance (each time requirement category A).

The glasses coated according to the invention withstood the tests indicated here and can therefore be used both in interior spaces and in the exterior field, for example, as architectural glazings.

The invention shall now be further explained by means of two additional examples of embodiment:

EXAMPLE 2

Green Antireflection

A UV filter with combined broadband antireflection action on soft glass, for the purpose of a green residual reflection color, is produced analogously to Example 1, but the first layer (M*) of Example 1 is now replaced by a layer M# which is drawn from a mixed silicon/titanium solution of modified composition. This solution has a silicon dioxide content of 11.0 g/l and a titanium dioxide content of 5.5 g/l.

Due to the relatively low titanium content, the M# layers thus produced have a somewhat lower index of refraction than M*.

Figure 9:
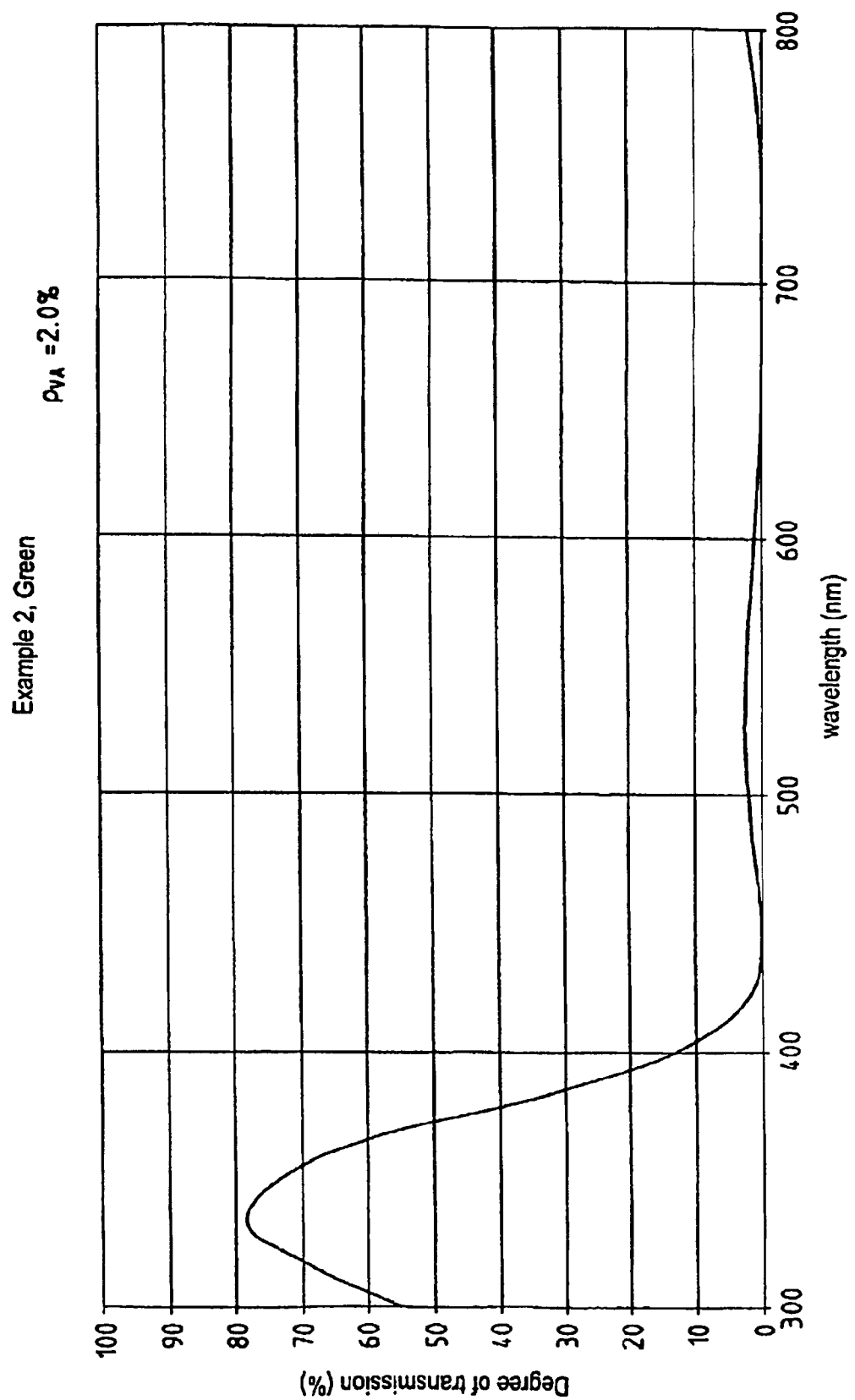

As the drawing speeds for the individual layers M#/T/M/T/S there are now selected: v=540/262/345/206/500 mm/min., obtaining an optical filter with a reflection characteristic according to FIG. 9, which differs essentially from the filter of Example 1 only in the altered residual reflection in the visible range. The other properties of the filter correspond to Example 1.

EXAMPLE 3

Blue-Violet Antireflection

Figure 10:
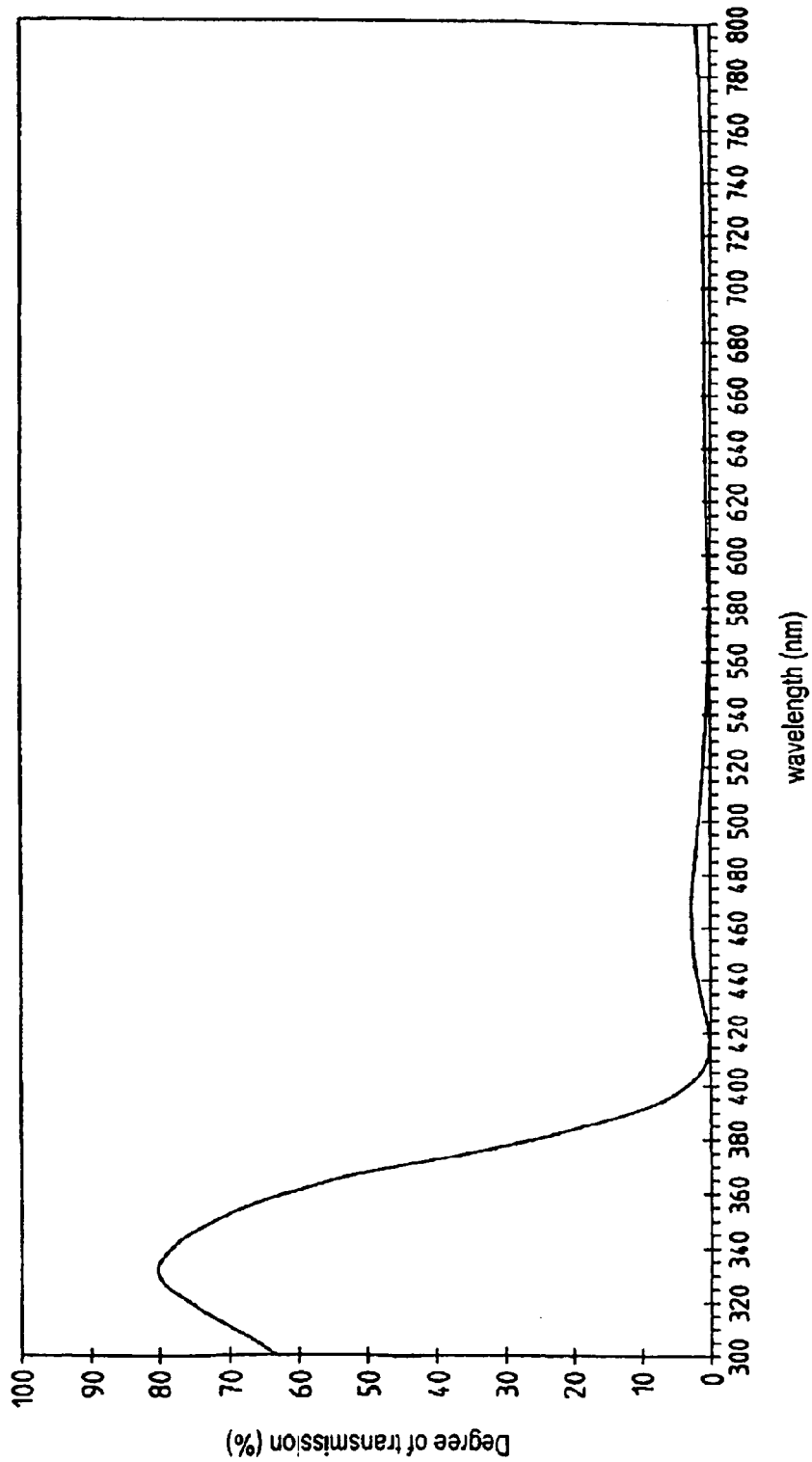
FIG. 10 reflection characteristic of a system according to the invention according to Example 3

A filter according to the invention, but with blue-violet color of the residual reflection, is produced by the method and also with the individual layers of Example 1, but with the following drawing speeds for M*/T/M/T/S: v=525/247/302/194/470 mm/min. In this way, a filter with a reflection characteristic according to FIG. 10 is obtained. The other properties of the filter except for the altered color impression of the residual reflection correspond to those of Examples of embodiment 1 and 2.

The invention for the first time specifies a coating which makes the glass/air interfaces antireflecting in the visible wavelength range (380–780 nm), preferably neutral in color, and at the same time it substantially improves the UV protection properties of transparent substrates in the wavelength range of UV-A (315–380 nm) and UV-B (280–315 nm).

Fields of application of the optical filters according to the invention, besides the coating of glass panes, are the coating of light bulbs in the light industry in order to improve the emitted visible light with color neutrality, especially including that at rather large emission angles, while at the same time reducing the UV radiation. This applies especially to gas discharge lamps with quartz glass bulbs, such as metal halide bulbs, but also to a lesser extent to halogen lamps with quartz or hard glass bulbs.

Furthermore, tubular casings for lamps can be coated with the filter according to the invention, and the filter can be used on planar front panels of hard and soft glass.

An especially preferred usage of the interference layer systems according to the invention is the coating of thermal protection glasses.

Figure 11A:
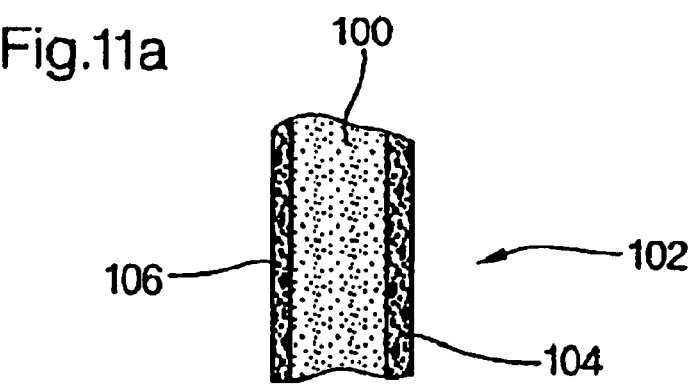
FIGS. 11a–11c schematic representation of various thermal protection glasses
Figure 11B:
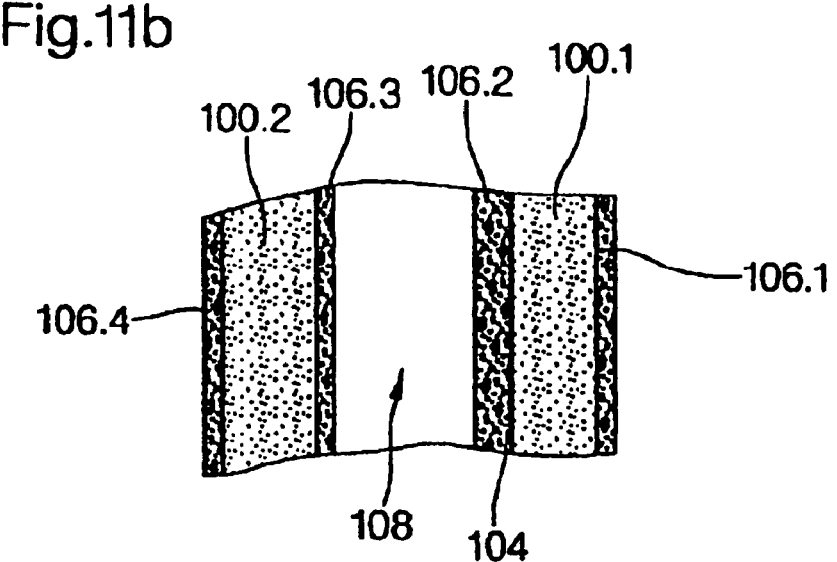
Figure 11C:
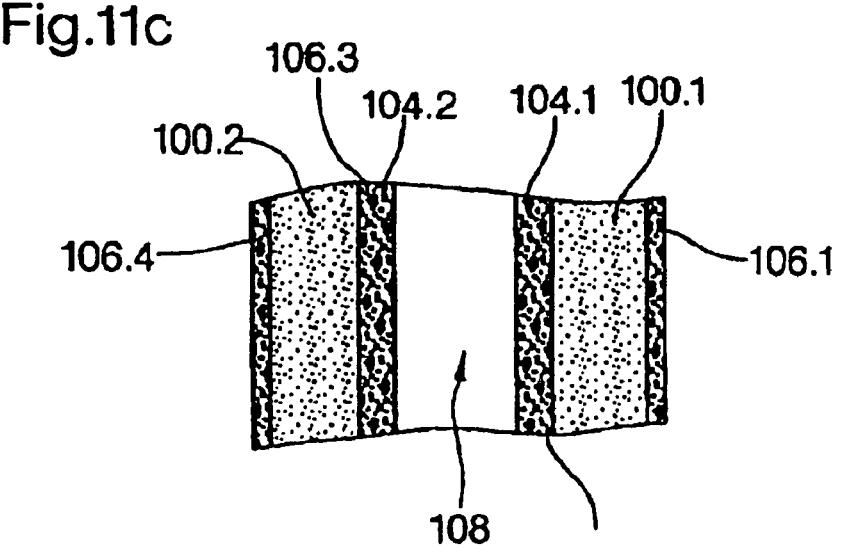

FIGS. 11a through 11c represent application configurations of UV-reflective thermal protection glasses according to the invention, wherein at least one side of a transparent substrate has been coated with a UV-reflective, interference system of five layers. Other layer structures are also possible, as long as the individual layers contain the temperature-stable inorganic materials according to the invention.

FIG. 11a shows a simple system, a so-called single pane, comprising a substrate 100, on whose side facing the interior of a space 102 has been deposited a thermal protection layer, in the present case, a tin oxide layer 104. On the outer side, the single pane comprises an interference layer system 106 according to the invention. With such a system, a transmission of more than 93% and a reflection of 2% in the visible range are achieved, and in the UV range the transmission is reduced to less than 8% of the incident light.

The achievable k-value is 3.5 W/m²K.

By using two transparent substrates 100.1, 100.2, it is possible to construct a double insulated glass pane, as shown in FIG. 11b. In the case of the double insulated glass pane shown in FIG. 11b, only one transparent substrate, the transparent substrate 100.1, is coated with a heat-reflecting tin oxide layer 104. The tin oxide layer 104 adjoins the interior 108 of the double pane. On all four sides of the two transparent substrates 100.1, 100.2, UV-reflective interference layer systems 106.1, 106.2, 106.3, 106.4 are deposited. With such a system, a transmission of more than 88% can be achieved with a reflection of less than 3% in the visible range. The transmission in the UV range is less than 4%, and the k-value is 1.6 W/m²K.

FIG. 11c, in turn, shows a system with two transparent substrates 100.1, 100.2. The system is distinguished from the system of FIG. 11b in that heat-reflecting layers 104.1, 104.2 are deposited on both transparent substrates 100.1, 100.2 on the inside 108 of the double insulated glass pane. As with the embodiment according to FIG. 11b, all sides of the transparent substrates are coated with a 5-layer interference system according to the invention.

In a system according to FIG. 11c, a transmission of more than 87% and a reflection of less than 3% in the visible range are achieved. The transmission in the UV range is less than 3% and the k-value is 1.2 W/m²K.

By UV region is meant primarily the wavelength region of 280 to 380 nm. The transparent substrate used is a non-iron-poor float glass substrate of 4 mm thickness.

In the case of the interference layer systems which are deposited on the thermal protection glass for broadband antireflection, the uppermost of the five layers (S) next to the air has an index of refraction which is less than that of glass (n=1.52). The layer consists preferably almost entirely of quartz glass (SiO$_2$, n=1.40–1.46). The second and fourth layers (T)—viewing from S—consist of a material with a high index of refraction (n=2.0–2.3), preferably titanium dioxide (TiO$_2$). The M layers have an intermediate index of refraction of n=1.6–1.8, which can be realized preferably by a mixed silicon/titanium oxide.

The layer thickness of the M layer(s) next to the glass or tin oxide is 70–100 nm, depending on the configuration of the optical filter, that of the other M layers is 20 to 40 nm, the T layer closer to the glass has a layer thickness of 30 to 70 nm, the T layer closer to S is 30 to 50 nm, and the cover layer (S) is 90 to 110 nm.

These materials are deposited on the glass substrate preferably by dip methods, for example, it is possible to coat a flat glass pane either on both sides or, after covering one side of the glass, just on one side. The thermal protection glasses obtained with the interference layer system according to the invention shall now be explained more closely by means of examples of embodiment:

EXAMPLE 4

A plate glass coated on one side with tin oxide (d=3 mm, not iron-poor, surface resistance 15 Ohms) is provided on both sides identically with a UV-reflective 5-layer broadband antireflection coating by means of the dip method (sol-gel process) in keeping with Example 1 mentioned above, so that a structure STMTM/glass/tin oxide/MTMTS is formed.

Figure 12A:
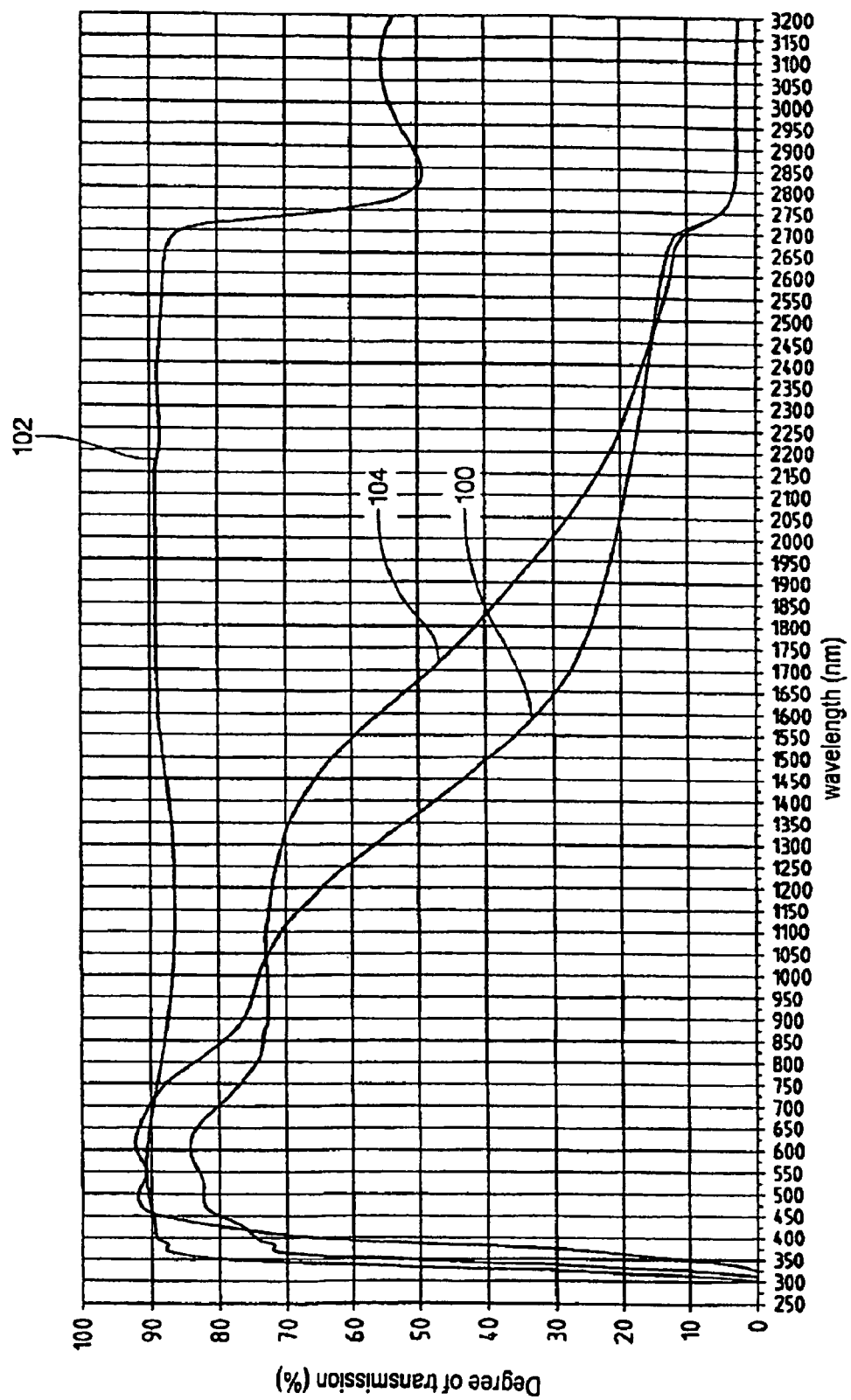
FIGS. 12a–12c transmission characteristic of thermal-protection glasses according to Example 4
Figure 12B:
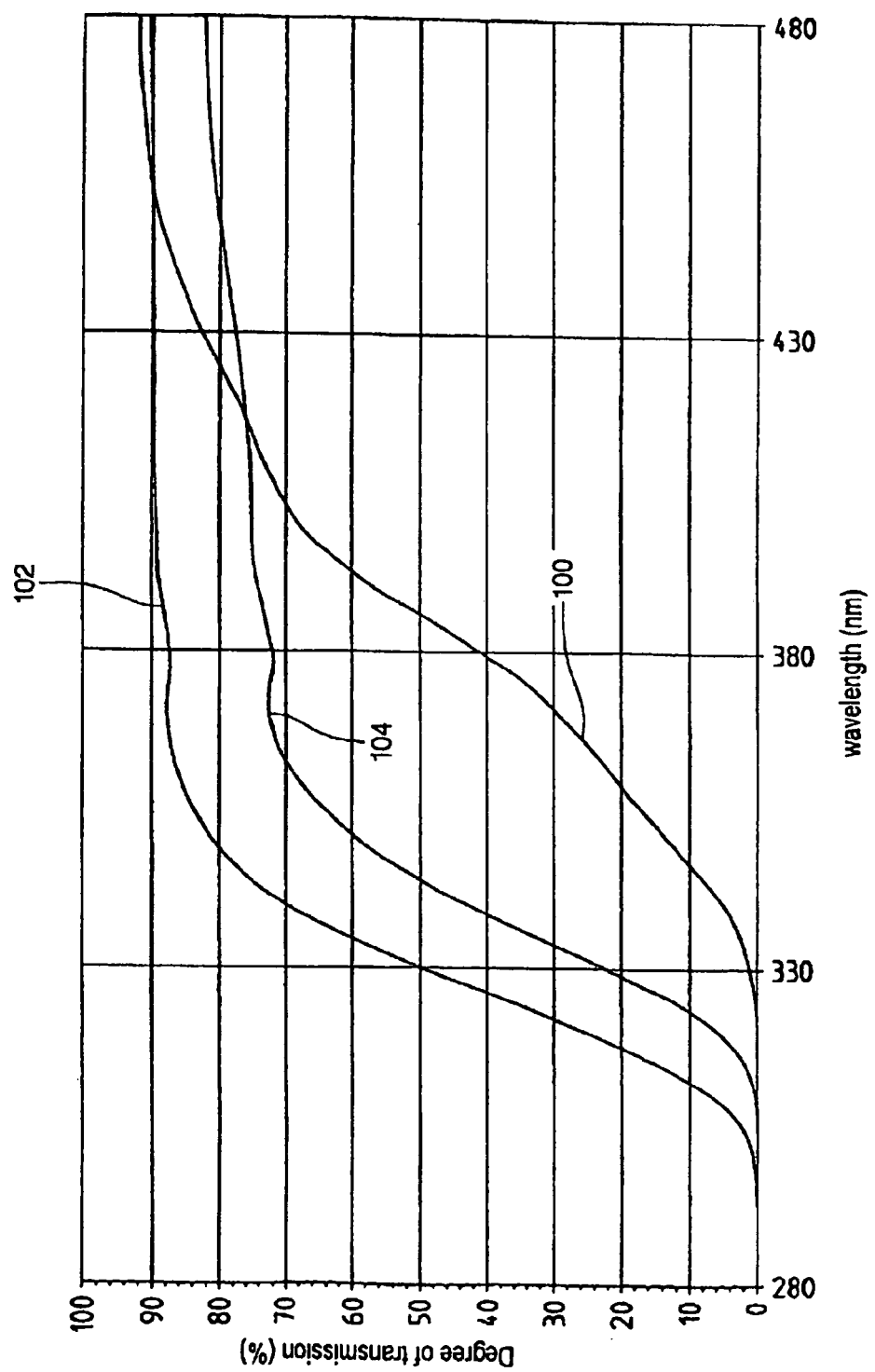
Figure 12C:
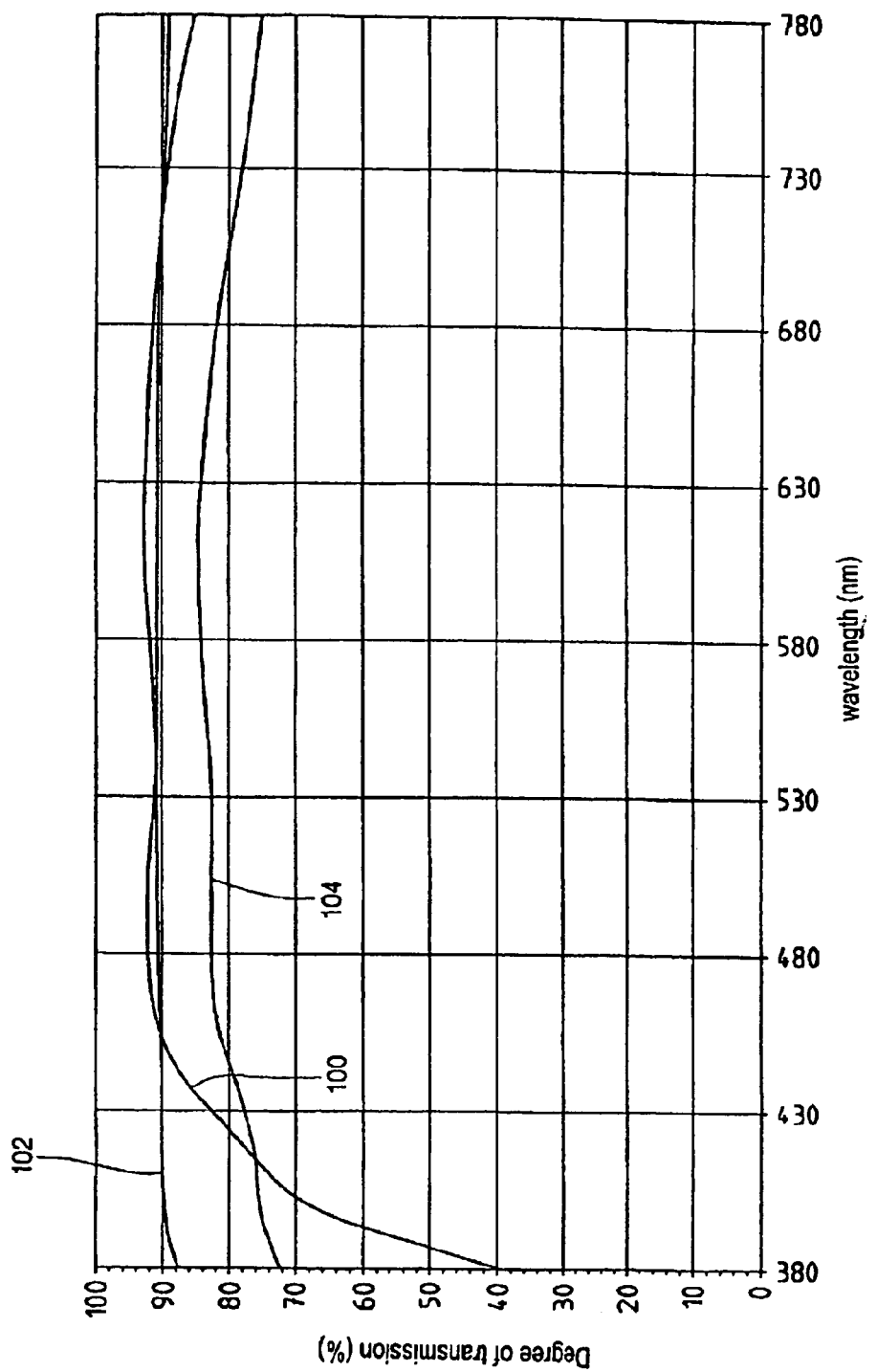
Figure 12D:
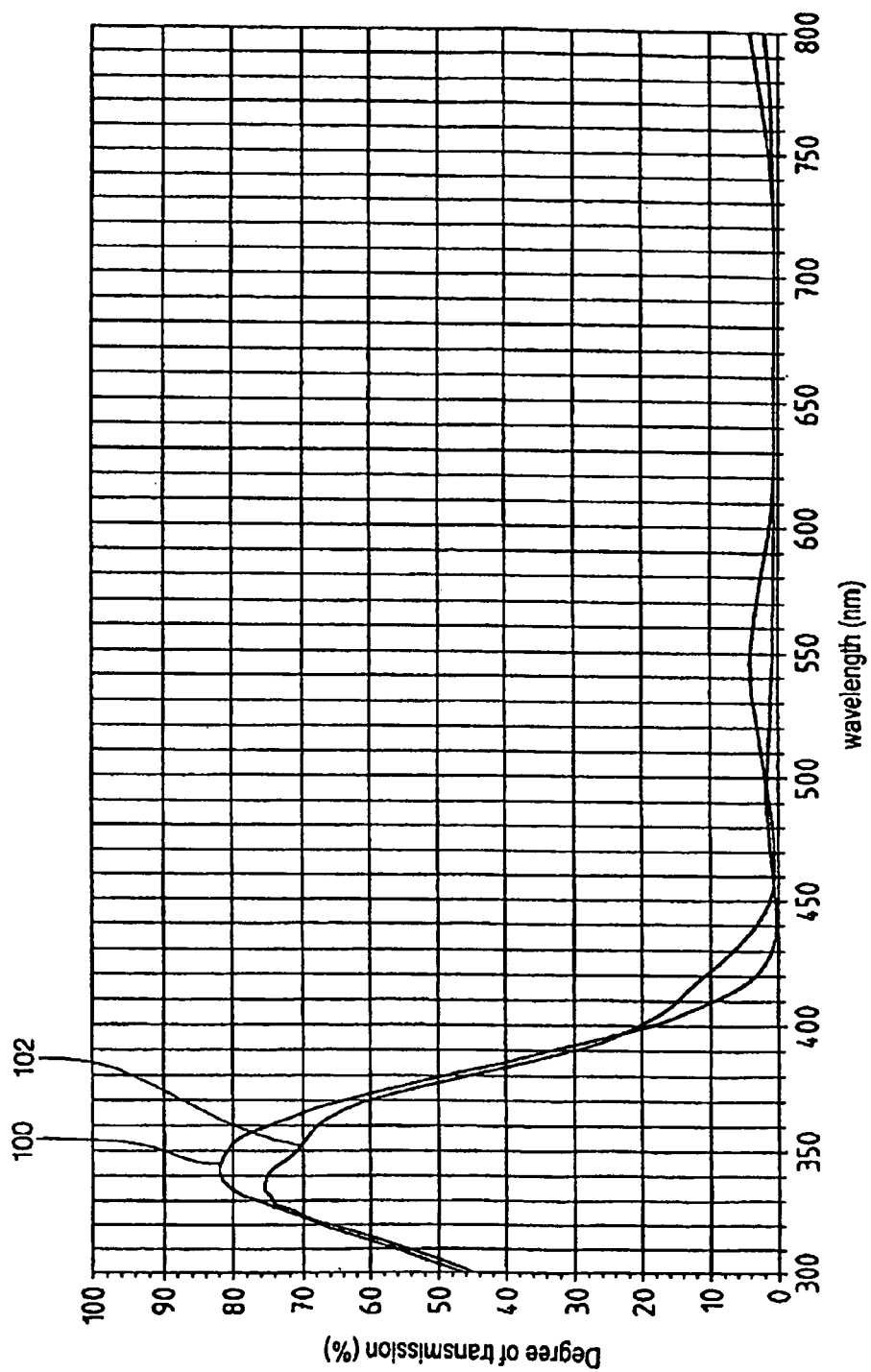
FIGS. 12d–12e reflection characteristic of thermal protection glasses according to Example 4
Figure 12E:
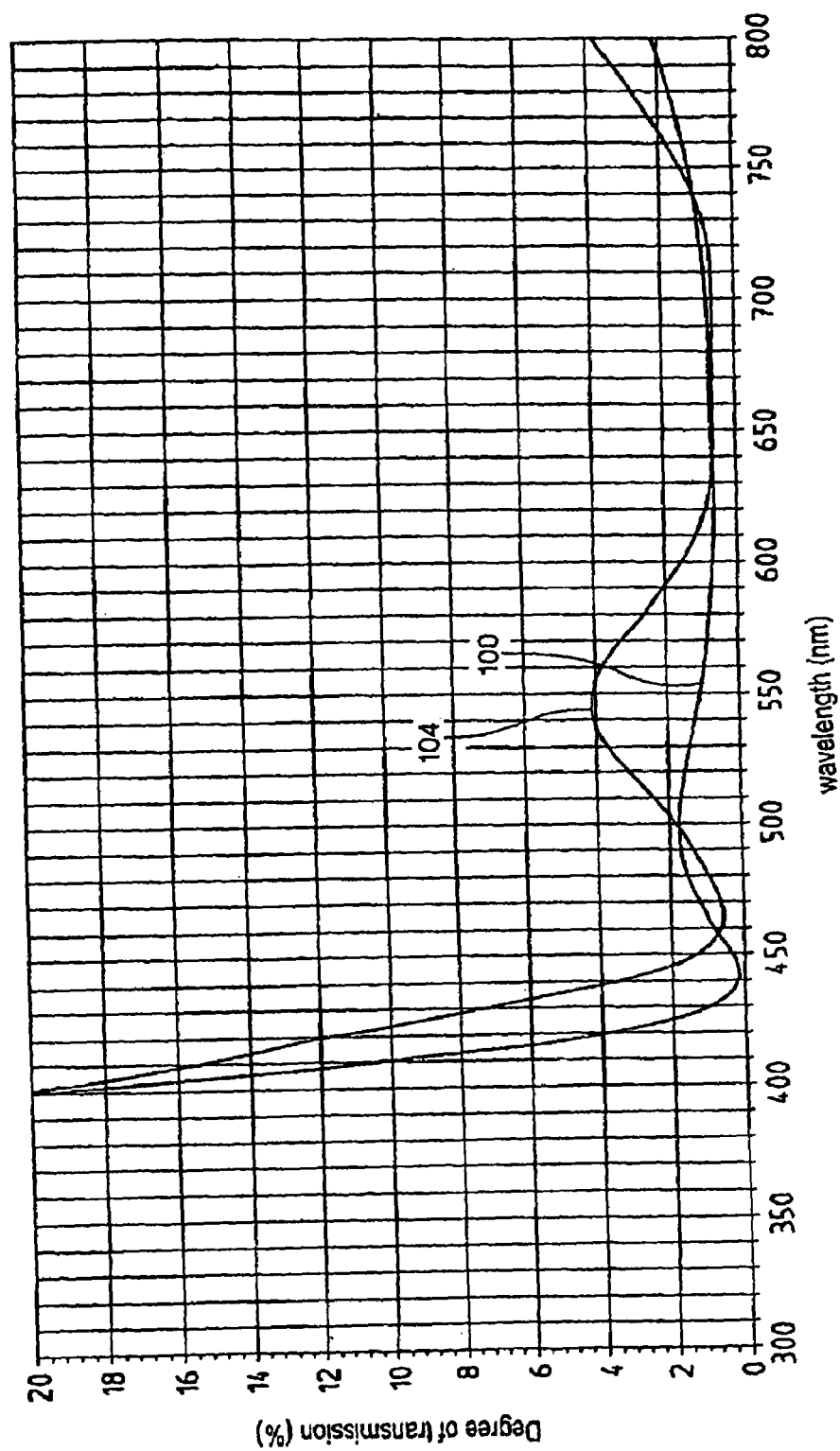

The plate glass thus improved has a wavelength-dependent transmission according to FIGS. 12a–12c and a reflection characteristic (when the tin oxide side is illuminated) according to FIGS. 12d and 12e. The coatings have a high optical quality and are free of cracks, visible opacities, and light scattering.

One particular feature of the invention is the smoothing out of the tin oxide surface, which is relatively rough prior to the coating, thanks to the 5-layer antireflection coating:

while the uncoated tin oxide surface is characterized by roughness values of $R_a/R_z/R_{max}$=0.02/0.30/0.52 µm, these values are reduced to 0.02/0.08/0.10, by the antireflection coating, which corresponds to the values for uncoated float glass.

As cleaning tests show, this also makes possible an application of the tin oxide layer to the outside of glazings, and thus in the simplest instance a single-pane thermal protection glazing, as shown in FIG. 11a. This is of special interest for exhibition halls, for which thus far it was only possible to use single-pane glazings without a heat-reflecting layer. But since the heat-reflection function is impaired by a coating of water, the tin oxide side must be directed toward the interior of the building.

FIG. 12c shows that, in the visible range, only a moderate antireflection action of around 1% is achieved with the coated glass 100 according to the invention—as compared to fully uncoated float glass 102—but the heat transfer coefficient is lowered from 5.8 W/m²K to around 3.5 W/m²K, and thus approaches the k-value of an uncoated insulated glass double pane of around 3.0 W/m²K. The UV transmission (FIG. 12b) is lowered from 55% for uncoated float glass 102 or 40% for float glass with AMIRAN antireflection on both sides, to 8% (not shown in FIG. 12b).

As FIG. 12a shows, above a wavelength of around 2500 nm in the infrared the optical properties of the tin oxide layer are not altered by the UV-reflective antireflection layers. In the intermediate range of the near infrared (NIR, 780–2500 nm), a considerable sun protection action is achieved as compared to uncoated K-glass 104, since the lowering of the transmission in the range of 1050 to 2400 nm significantly outweighs the transmission gain in the range of 780–100 nm, both times weighted with the incoming radiation spectrum of the sun.

The single pane coated with an interference layer system according to the invention according to Example 4 can also be used to construct double-panel insulated glass.

The single pane according to Example 4, furthermore, can be used as an electric heating panel, if the tin oxide layer is grounded as an antielectrostatic element, or for reflection of electromagnetic waves.

The following service-life and application tests according to DIN EN 1096-2 have been carried out on the filter prepared according to Example 1: testing for resistance to water of condensation, testing for acid resistance, testing for salt spray/mist (neutral), testing for wear resistance, each time requirement category A, and the requirement for architectural glazings has been fulfilled.

FIGS. 12d–e show the reflection curves for thermal protection glass 104 as compared to thermal protection glass 104 coated with the interference layer system according to the invention.

Additional examples of embodiment for UV-reflective thermal protection glass shall be specified below.

EXAMPLE 5

A plate glass coated on one side with tin oxide according to Example 4 is provided with a modified 5-layer antireflection, thereby forming the structure STMTM/glass/tin oxide/TMTS, which is equivalent to omitting the thick M layer on the tin oxide side. This is achieved by first gluing together two plate glasses at the edges by the tin oxide sides, then coating the combination with an M layer according to Example 4 by the dip method, separating the panes, and then further coating each of them on both sides with the structure TMTS, all of this according to Example 4.

The UV-reflective thermal protection glass according to Example 5 according to the invention has largely the same properties as that produced by Example 4; the major difference is an improved transmission in the visible range of 92%, which is accomplished by a mean visible reflection improved to 1.9%.

EXAMPLE 6

The method is the same as in Example 5, except that the drawing speed to produce the T-layer closer to the glass is reduced from 262 mm/min. to 220 mm/min., and thus the thickness of this layer is reduced by around 11%. In this way, the mean visible residual reflection is further reduced to 1.5%, so that the visible transmission is further improved to 93%, while the other properties are unchanged in comparison to Examples 4 and 5.

As is apparent, for example from FIGS. 6, 7, 8b, 9 and 10 as well as FIGS. 12b–e, the reflectivity of the interference layer system in the wavelength range of 300–380 nm is ≧20% and the reflectivity in the wavelength range of 450–800 nm is ≦5%.

What is claimed is:

1. A method for coating a transparent substrate with a coating system, comprising:

performing a dip or spin method of sol-gel techniques to deposit at least five individual layers on the transparent substrate, wherein consecutive layers of the five individual layers have different indices of refraction and the five individual layers have UV and temperature-stable inorganic materials, wherein the five individual layers have the following structure:

substrate/M1/T1/M2/T2/S, wherein substrate designates the transparent substrate, M1, M2 denote layers with intermediate index of refraction, T1, T2 denote layers with high index of refraction, S denotes a layer with low index of refraction, and for a reference wavelength of 550 nm the indices of refraction of the individual layers lie in the following range: $n_{low}$≦1.6; 1.6< $n_{intermediate}$<1.8; and 1.9 ≦$n_{high}$, and the thickness of the individual layers lies in the following range:

for the layer M1: 70 nm≦$d_{M1}$≦100 nm for the layer T1: 30 nm≦$d_{T1}$≦70 nm for the layer M2: 20 nm≦$d_{M2}$≦40 nm for the layer T2: 30 nm≦$d_{T2}$≦50 nm for the layer S: 90 nm≦$d_S$≦110 nm.

2. A method for the coating of a transparent substrate, comprising:

depositing by means of cathode sputtering, physical vaporization, or chemical gas-phase deposition at least five individual layers to the transparent substrate, wherein consecutive layers of the five individual layers have different indices of refraction and the five individual layers have UV and temperature-stable inorganic materials, wherein the five individual layers have the following structure:

substrate/M1/T1/M2/T2/S, wherein substrate designates the transparent substrate, M1, M2 denote layers with intermediate index of refraction, T1, T2 denote layers with high index of refraction, S denotes a layer with low index of refraction, and for a reference wavelength of 550 nm the indices of refraction of the individual layers lie in the following range: $n_{low}$≦1.6; 1.6< $n_{intermediate}$<1.8; and 1.9 ≦$n_{high}$, and the thickness of the individual layers lies in the following range:

for the layer M1: 70 nm≦$d_{M1}$≦100 nm for the layer T1: 30 nm≦$d_{T1}$≦70 nm for the layer M2: $20\ nm \leq d_{M2} \leq 40\ nm$
for the layer T2: $30\ nm \leq d_{T2} \leq 50\ nm$
for the layer S: $90\ nm \leq d_s \leq 110\ nm$.

3. The method according to claim 1, wherein the substrate is coated on both sides.

4. The method according to claim 1, wherein the substrate is only coated on one side.

5. A method for coating a UV-reflective interference layer system on a transparent substrate, the method comprising:
depositing a first layer on a first side of the transparent substrate, the first layer having an intermediate index of refraction and a first thickness greater than or equal to 70 nm but less than or equal to 100 nm;
depositing a second layer on the first layer, the second layer having a high index of refraction and a second thickness greater than or equal to 30 nm but less than or equal to 70 nm;
depositing a third layer on the second layer, said third layer having said intermediate index of refraction and a third thickness greater than or equal to 20 nm but less than or equal to 40 nm;
depositing a fourth layer on the third layer, said fourth layer having said high index of refraction and a fourth thickness greater than or equal to 30 nm but less than or equal to 50 nm; and
depositing a fifth layer on the fourth layer, said fifth layer having a low index of refraction and a fifth thickness greater than or equal to 90 nm but less than or equal to 110 nm, wherein at a reference wavelength of 550 nm said low index of refraction is less than or equal to 1.6, said intermediate index of refraction is between 1.6 and 1.8; and said high index of refraction is greater than or equal to 1.9.

6. The method according to claim 5, wherein said first through fifth layers are deposited by a method selected from the group consisting of a dip method, a spin method, cathode sputtering method, a physical vaporization method, and a chemical gas-phase deposition method.

7. The method according to claim 5, wherein said first through fifth layers are formed of temperature-stable inorganic oxides.

8. The method according to claim 7, wherein said inorganic oxides are largely transparent above a wavelength of light of 320 nm.

9. The method according to claim 7, wherein said first through fifth layers comprise a material selected from the group consisting of $TiO_2$, $Nb_2O_5$, $Ta_2O_5$, $CeO_2$, $HfO_2$, $SiO_2$, $MgF_2$, $Al_2O_3$, $ZrO_2$, and any combinations thereof.

10. The method according to claim 5, wherein said high index of refraction layers comprises $TiO_2$, said low index of refraction comprises $SiO_2$, and said intermediate index of refraction comprises a mixture of $TiO_2$ and $SiO_2$.

11. The method according to claim 5, further comprising depositing said first through fifth layers on a second side of the transparent substrate.

12. The method according to claim 5, further comprising covering a second side of the transparent substrate.

13. The method according to claim 12, further comprising depositing a heat-reflecting coating on said second side.

14. The method according to claim 5, further comprising depositing a heat-reflecting coating on the first side of the transparent substrate before deposition of said first layer.

15. The method according to claim 14, further comprising depositing said heat-reflecting coating on a second side of the transparent substrate.

16. The method according to claim 5, further comprising depositing a heat-reflecting layer on said fifth layer.

17. The method according to claim 16, wherein said heat-reflecting layer has a surface resistance less than 20 $\Omega$.

18. A method of forming a UV-reflective interference layer system for a transparent substrate, comprising:
applying a first layer to the transparent substrate, said first layer having an intermediate index of refraction;
applying a second layer to said first layer, said second layer having a high index of refraction;
applying a third layer to said second layer, said third layer having said intermediate index of refraction;
applying a fourth layer to said third layer, said fourth layer having said high index of refraction; and
applying a fifth layer to said fourth layer, said fifth layer having a low index of refraction, said first through fifth layers combining to transmit less than 8% of light having an UV wavelength while transmitting greater than 90% of light having a visible wavelength.

19. The method according to claim 18, wherein said intermediate index of refraction is between about 1.6 and about 1.8 for a reference wavelength of 550 nm, said high index of refraction of greater than or equal to 1.9 for said reference wavelength, and said low index of refraction is less than or equal to 1.6.

20. The method according to claim 18, wherein the transparent substrate is glass selected from the group consisting of a hard glass, a soft glass, and quartz glass.

21. The method according to claim 18, further comprising applying a heat-reflecting coating to either said fifth layer or between the transparent substrate and said first layer.

22. The method according to claim 21, wherein said heat-reflecting coating provides a heat transfer value less than 3.5 $W/m^2K$.

23. The method according to claim 18, wherein said first through fifth layers combine to provide broadband antireflection at a viewing angle in a range of between 12.5 degrees to about 50 degrees.

* * * * *